United States Patent [19]

Huyffer

[11] 4,104,269
[45] Aug. 1, 1978

[54] METHOXYMETHOXY PROTECTED INTERMEDIATES FOR PHOTOGRAPHIC DYES

[75] Inventor: Paul S. Huyffer, West Boxford, Mass.

[73] Assignee: Polaroid Corporation, Cambridge, Mass.

[21] Appl. No.: 773,004

[22] Filed: Feb. 28, 1977

Related U.S. Application Data

[60] Division of Ser. No. 282,872, Aug. 22, 1976, Pat. No. 4,035,401, which is a division of Ser. No. 22,114, Mar. 30, 1970, Pat. No. 3,925,347, which is a continuation of Ser. No. 655,306, Jul. 24, 1967, abandoned.

[51] Int. Cl.² .................. C09B 29/38; G03C 5/54; G03C 7/00
[52] U.S. Cl. .................. 260/162; 96/2; 96/3; 96/29 D; 96/76 R; 260/147; 260/160; 260/372; 260/373; 260/404.5; 260/556 B
[58] Field of Search .................. 260/162

[56] References Cited

U.S. PATENT DOCUMENTS

| | | | |
|---|---|---|---|
| 3,443,939 | 5/1969 | Bloom et al. | 96/3 |
| 3,498,785 | 3/1970 | Bloom et al. | 96/3 |
| 3,923,779 | 12/1975 | Curtis | 260/162 X |

*Primary Examiner*—Floyd D. Higel
*Attorney, Agent, or Firm*—John P. Morley

[57] ABSTRACT

This invention relates to compounds of the formula:

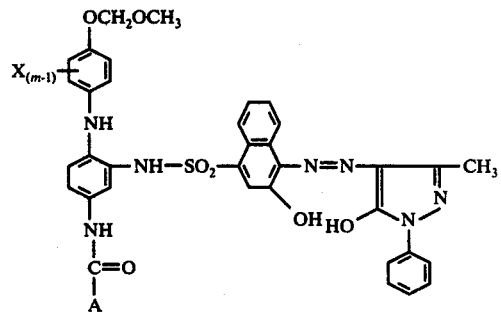

wherein:
X is methyl, methoxy, hydroxy, amino, chloro or carboxy;
m is a positive integer from 1 to 2; and
A is an alkyl radical having from 9–17 carbon atoms.

The compounds of this invention are particularly useful in diffusion transfer photographic products and processes.

2 Claims, No Drawings

METHOXYMETHOXY PROTECTED INTERMEDIATES FOR PHOTOGRAPHIC DYES

This application is a division of U.S. patent application Ser. No. 282,872 filed Aug, 22, 1976 (and now U.S. Pat. No. 4,035,041) which was a division of U.S. patent application Ser. No. 22,114 filed Mar. 30, 1970 (now U.S. Pat. No. 3,925,347) which, in turn, was a continuation of application Ser. No. 655,306 filed July 24, 1967 and now abandoned.

BACKGROUND OF THE INVENTION

The copending application of Stanley M. Bloom, Ser. No. 655,338 (now U.S. Pat. No. 3,751,406) filed concurrently discloses novel chemical compounds containing a dye moiety and which also have an "anchoring" moiety which renders the compound immobile and non-diffusible in a photographic processing composition. Upon oxidation, these compounds may auto-react intramolecularly in such a way as to form a new heterocyclic ring and, as a function of such reaction, to split off the dye moiety as a mobile and diffusible color-providing material.

One group of compounds of this description are represented in this copending application as being of the formula:

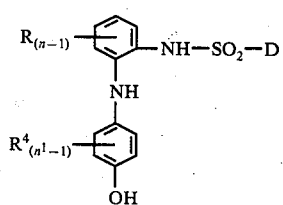

(A)

wherein:
each of R and $R^4$ comprises a long chain amide, e.g., of at least 13 carbon atoms, bonded directly to a nuclear carbon atom or linked indirectly thereto through an alkylene or phenylene substituent;
D represents a dye moiety, e.g., a monoazo, disazo or anthraquinone dye moiety; and
$n$ and $n^1$ may be 1 or 2, provided that at least one of them is 2 to provide an anchoring moiety; and nuclear substituted derivatives thereof, e.g., where any of the nuclear carbon atoms of the respective benzene moieties not containing one of the specifically designated substituents may contain a carboxy, alkyl, alkoxy, amino, chloro, hydroxy or amide substituent.

Such compounds may be prepared by the following sequence of reactions:

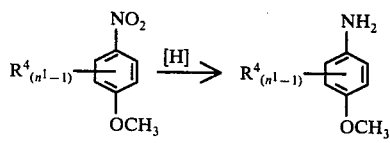
(I)

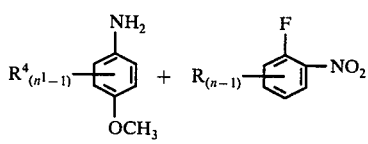
(II)

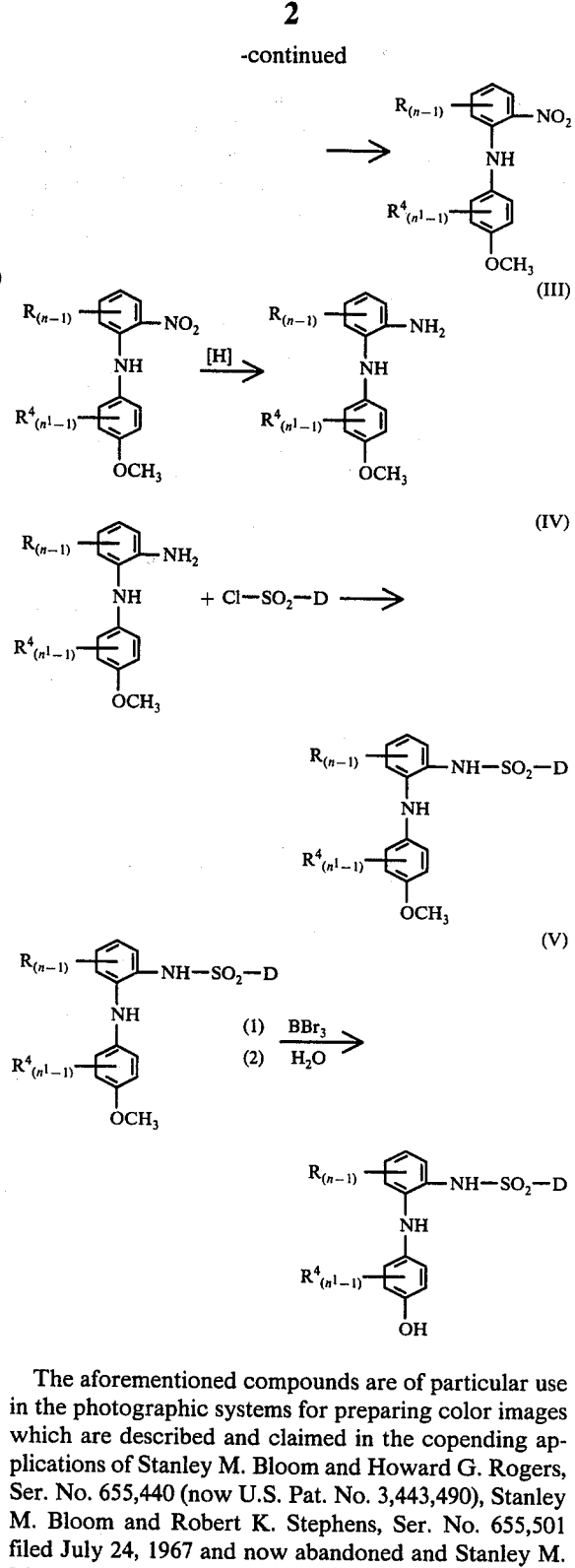

The aforementioned compounds are of particular use in the photographic systems for preparing color images which are described and claimed in the copending applications of Stanley M. Bloom and Howard G. Rogers, Ser. No. 655,440 (now U.S. Pat. No. 3,443,490), Stanley M. Bloom and Robert K. Stephens, Ser. No. 655,501 filed July 24, 1967 and now abandoned and Stanley M. Bloom and Robert K. Stephens, Ser. No. 655,436 (now U.S. Pat. No. 3,443,939), all filed concurrently.

The present invention is directed to novel procedures for preparing compounds of the foregoing description, which procedures greatly facilitate synthesis of the desired compound and in fact make it possible to obtain readily certain compounds of the above-mentioned formula which can only be obtained with great difficulty, if at all.

SUMMARY OF THE INVENTION

According to the present invention, compounds within the above-mentioned formula may be readily obtained by employing a methoxymethoxy substituent in lieu of a methoxy substituent as the protected hydroxy group in the above sequence of steps. The desired hydroxy group may be readily obtained by hydrolysis, e.g., with a mineral acid such as HCl.

The novel procedures of this invention may be employed in conjunction with the procedures described and claimed in the copending application of Harris L. Curtis, Ser. No. 655,304 filed July 24, 1967 and now abandoned and directed to a novel synthesis of certain compounds within the scope of the above formula.

As was mentioned previously, this invention relates to novel procedures for preparing compounds useful in photographic processes for preparing color images.

A primary object of this invention, therefore, is to provide novel procedures of the foregoing description.

Another object is to provide novel intermediates which may be readily hydrolyzed to obtain compounds containing a dye moiety and which also have an anchoring moiety rendering the compound immobile and non-diffusible in a photographic processing composition, which compounds, upon oxidation, may auto-react intramolecularly in such a way as to form a new heterocyclic ring and, as a function of such reaction, split off the dye moiety as a mobile and diffusible dye.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The novel process of this invention by which the aforementioned objectives are accomplished may be illustrated by the following sequence of steps:

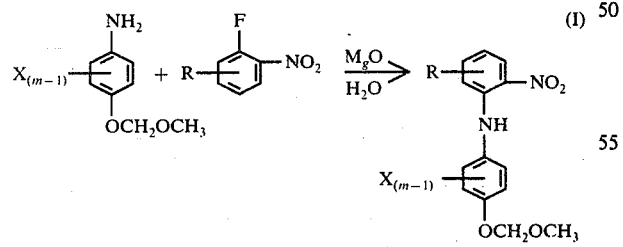

(I)

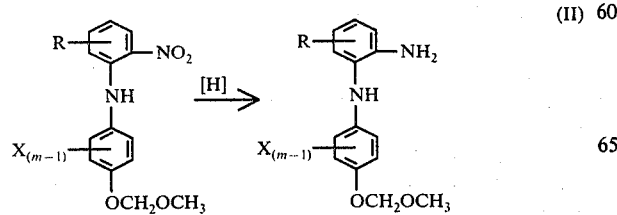

(II)

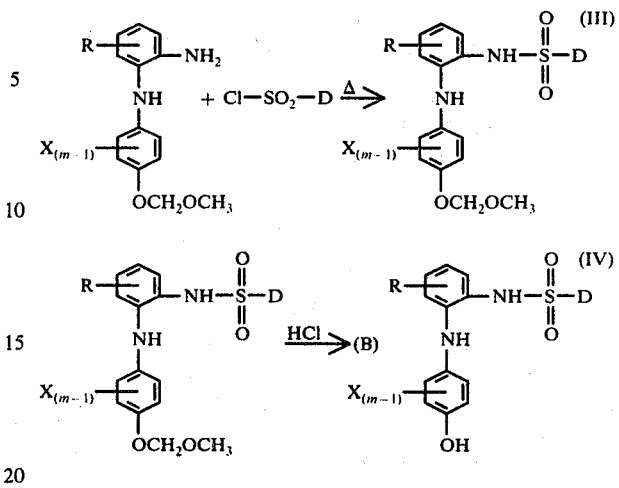

In the above sequence of reactions, R, n and D have the meanings heretofore noted, X is an alkyl radical, e.g., methyl, an alkoxy radical, e.g., methoxy, hydroxy, amino, chloro, or carboxy; and $m$ is a positive integer from 1-5, inclusive, it being understood that where $m$ is 1, hydrogen atoms are bonded to the respective four unsubstituted carbon atoms.

The process of this invention may be employed in conjunction with the procedures described and claimed in the aforementioned application of Harris L. Curtis, Ser. No. 655,304 filed July 24, 1967 and now abandoned to prepare certain compounds within the scope of formula B, which compounds may be represented by the formula:

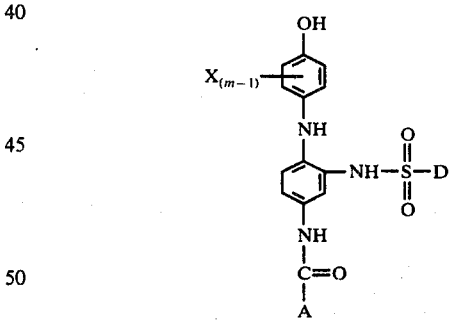

wherein D, X and $m$ have the meanings heretofore noted, and

A is an alkyl radical of at least nine carbon atoms.

The synthesis of compounds within the scope of formula (C) may be illustrated as follows:

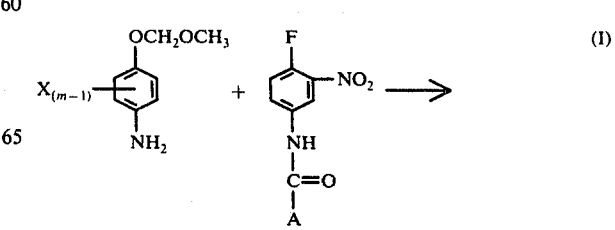

(I)

-continued

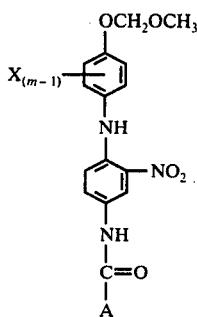

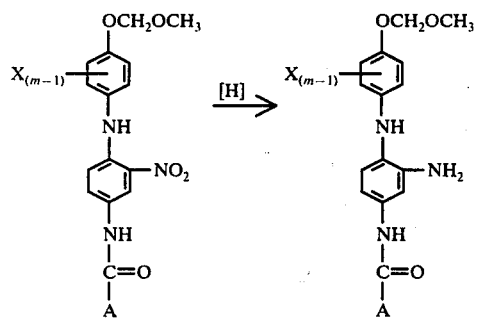

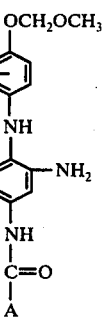

(II)

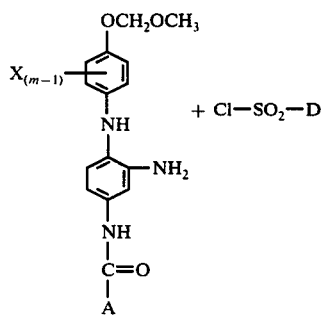

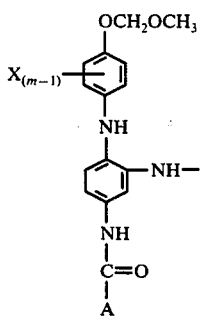

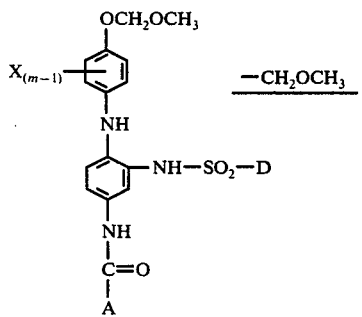

(III)

(IV)

-continued

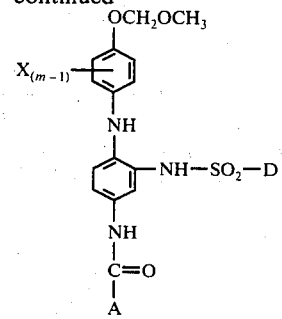

The starting p-methoxymethoxy-anilines of step I in the above two sets of reaction sequences are in general known in the art. They may be prepared by replacing the hydrogen atom of the hydroxyl moiety of the corresponding p-nitrophenol with a —$CH_2OCH_3$ substituent in known manner, e.g., methoxymethylation by reaction of the nitrophenol with $ClCH_2OCH_3$ followed by catalytic hydrogenation to reduce the nitro group to an amino group to provide the desired methoxymethoxy compound. P-nitrophenols from which the starting protected derivative (methoxymethoxy derivative) may be obtained may be selected from those heretofore known in the art, e.g., p-nitrophenol, 4-nitro-2-methylphenol, 4-nitro-2-methoxyphenol, 4-nitro-2-carboxyphenol, 4-nitro-2-chlorophenol, 4-nitro-2,6-dimethylphenol, 4-nitro-2,6-dimethoxyphenol, 4,6-dinitro-2-methylphenol, 4-nitro-2-ethoxyphenol, 4-nitro-2-propoxyphenol, 4-nitro-2-butoxyphenol, 4-nitro-2-amylphenol, 4-nitro-3-methylphenol, 4-nitro-3-ethylphenol, 4-nitro-3-penta-decylphenol, 4-nitro-3-decylphenol, 4-nitro-2,6-dichlorophenol, 4-nitro-2-methoxy-6-methyl-phenol, 4-nitro-2-ethoxy-6-methyl-phenol, 4-nitro-2-methyl-6-propylphenol, 4-nitro-2,3-dimethylphenol, 4-nitro-3,5-dimethyl-phenol, 4-nitro-3-methyl-5-propyl-phenol, 4-nitro-2,5-dimethylphenol, 4-nitro-2-isopropyl-5-methylphenol, 4-nitro-2,5-dimethoxyphenol, etc.

The reduction of step II (as well as the aforementioned reduction of the nitro group following methoxymethylation) may be performed by hydrogenation in the presence of a catalyst, i.e., introducing hydrogen gas into a mixture containing the nitro compound and one of the known hydrogenation catalysts, e.g., $Pd/BaSO_4$, Raney nickel, etc.

The dye sulfonyl chloride may be a sulfonyl chloride of any of the monoazo, disazo or anthraquinone dyes heretofore known in the art and may comprise any of the dye moieties disclosed in the aforementioned copending application Ser. No. 655,338 (now U.S. Pat. No. 3,751,406). In general, dyes containing a sulfonyl chloride substituent making them useful in the practice of this invention are well known. Accordingly, a long list of useful dyes which may be employed will be readily suggested to those skilled in the art. The preparation of such dyes is described in numerous texts and therefore will also be apparent to those skilled in the art. (See, for example, "Synthetic Dyes" by Venkataraman, 1952, Vol. I, pp. 197–201.)

The removal of the methoxymethyl protective group to form the desired hydroxy substituent may be readily accomplished by hydrolysis, e.g., with a mineral acid such as HCl in a suitable organic solvent such as methanol, ethanol, methyl cellosolve, etc.

The various reaction conditions, e.g., time, temperature and pressure of reaction, selection of solvents to form the reaction mixture, etc., are not essential to the practice of this invention and will be readily apparent to those skilled in the art in the light of the foregoing description. The essence of the invention is, therefore, the aforementioned selection of steps, in the order described, to obtain the desired dyes.

Where the dye employed is a metal-complexable dye, e.g., an azo dye having chelatable groups such as hydroxy or carboxy groups ortho, ortho' to the azo linkage, the present invention is adaptable to the preparation of metal complexes of dyes within formula (B), e.g., chromium, nickel, copper, etc., complexes. The dye may be metal-complexed either before or after removal of the protected group to form the corresponding hydroxy analogue. For example, the chromium complex of a dye of formula (B) may be formed by reaction between a suitable chromium salt, e.g., chromium chloride and the methoxymethoxy analogue of a complexable dye of formula (B), in known manner for formation of chromium complexes, followed by hydrolysis to form the desired compound.

As examples of compounds within the scope of formula (B) which may be prepared by the present invention, mention may be made of the following:

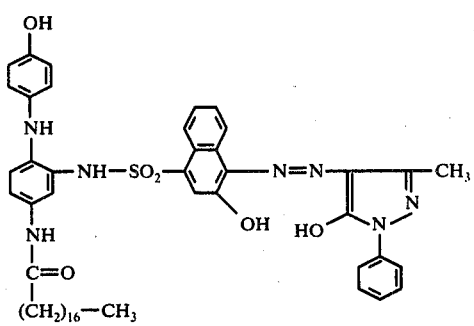

(1)

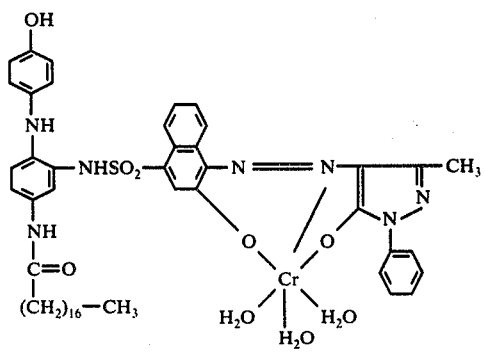

(2)

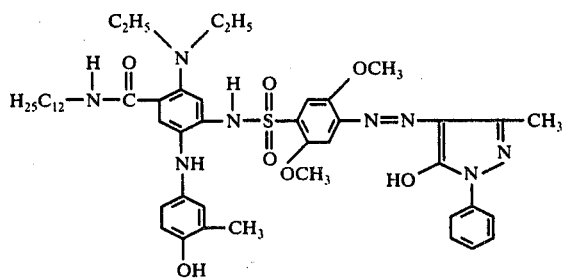

(3)

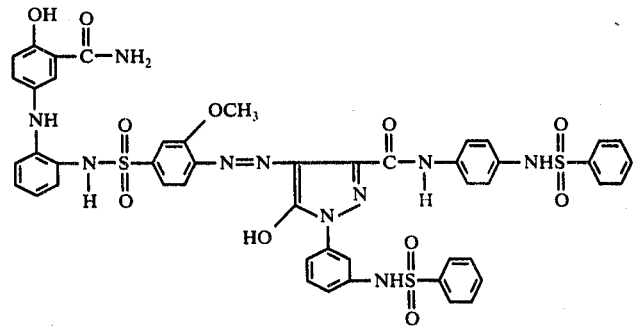

(4)

-continued
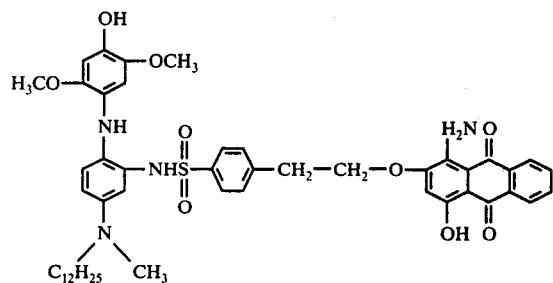
(5)
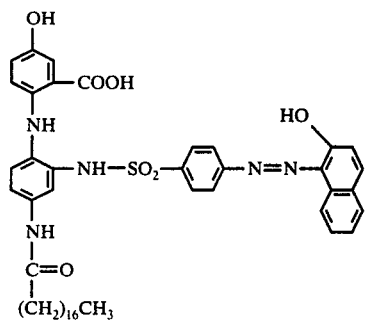
(6)
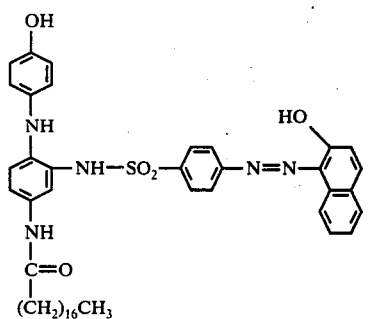
(7)
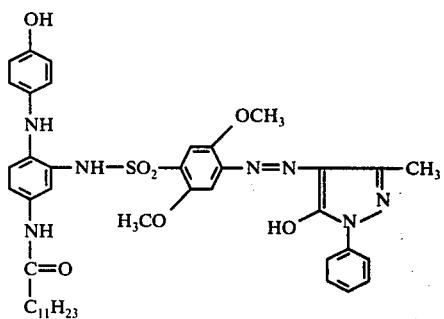
(8)
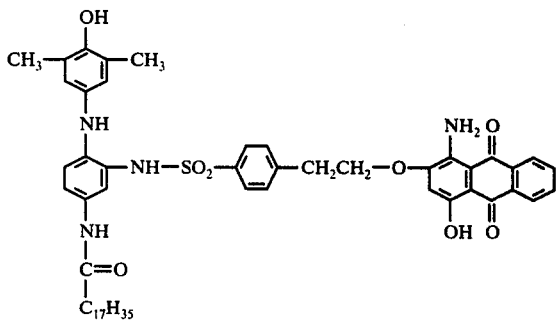
(9)

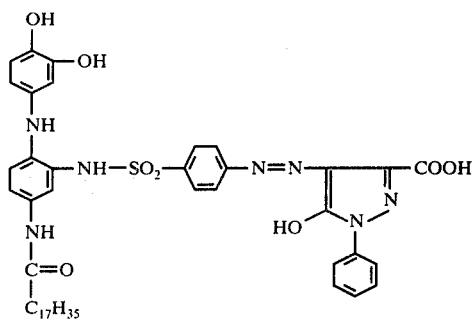
(10)

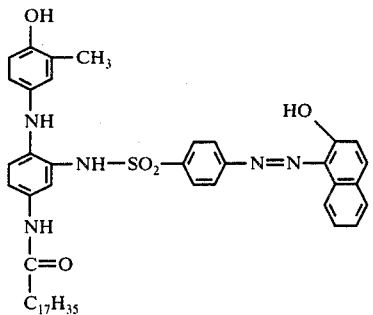
(11)

The following Examples show by way of illustration and not by way of limitation the practice of this invention.

EXAMPLE 1

Fifteen grams of 4-fluoro-5-nitro-aniline, 35.0 g. of stearoyl chloride and 8.4 g. of sodium bicarbonate were stirred overnight at room temperature. The reaction mixture was then refluxed and the insoluble inorganic salts were filtered off. Upon cooling of the filtrate, 2-fluoro-5-stearamido-nitrobenzene, an off-white solid was obtained, m.p. 82°–83° C., of the formula:

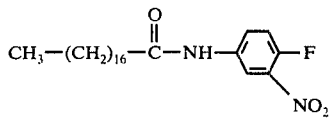

8.0 g. of the above compound, 14.5 g. of p-methoxymethoxy-aniline, 4.0 g. of magnesium oxide and 100.0 ml. of water were heated in a bomb with shaking at 180° C. for 2 days. After cooling, the contents were filtered and the solid obtained thereby was recrystallized from ethyl acetate to yield 6.0 g. of an orange crystalline solid, m.p. 118°–119° C. of the formula:

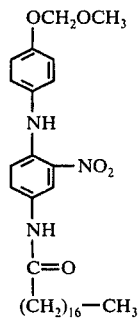

6.0 g. of the last-mentioned compound was hydrogenated in ethyl acetate using 5% palladium on barium sulfate as catalyst. After theoretical uptake was completed, the reaction mixture was heated to boiling and filtered through celite. After cooling, the filtrate was again filtered to yield 4.0 g. of the corresponding amine, a white solid, m.p. 113°–114° C. 5.4 g. of this amine (prepared in the above manner) and 4.9 g. of:

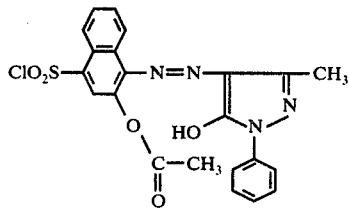

1-phenyl-3-methyl-4-(4'-chlorosulfonyl-2°-acetoxynaphthalene-1')azopyrazolone-5-one in 100 ml. of pyridine were heated overnight on a steam bath. The mixture was then poured into 300.0 ml. of 10% sodium bicarbonate and about 50.0 g. of ice. The resulting red solid was filtered and recrystallized from methanol to yield 5.0 g. of a sulfonamide, m.p. 139°–141° C. of the formula:

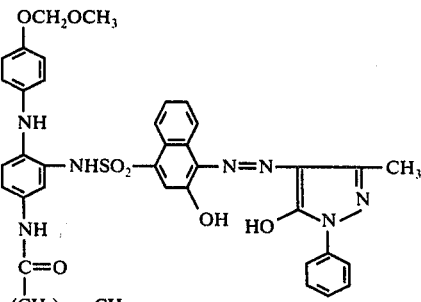

The above compound may be hydrolyzed by stirring in hot 10% hydrochloric acid and then filtering to yield the compound of formula 1.

EXAMPLE 2

5.0 g. of the methoxymethoxy analogue of the compound of formula 1 (prepared as in Example 1) and 3.0 g. of chromium chloride were refluxed overnight in 100 ml. of ethanol. The solvent was removed in vacuo and the residue was then dissolved in hot chloroform and filtered. The chloroform was evaporated and the resulting magenta solid was stirred in hot 10% HCl and filtered to yield 3.0 g. of the chromium complex of formula 2.

By way of recapitulation, the present invention is directed to a novel synthesis of a class of compounds described and claimed in the aforementioned copending application Ser. No. 655,338 (Now U.S. Pat. No. 3,751,406), which compounds are of particular use in color photography. In the preparation of these compounds it is necessary that the phenolic hydroxy group be protected during synthesis. The desired compound is finally obtained by removal of the protective groups.

In the aforementioned application Ser. No. 655,338 (now U.S. Pat. No. 3,751,406), the phenolic hydroxy group is protected by methylation. Subsequent removal of the protective group to form the corresponding hydroxy analogue requires strong reaction conditions, e.g., by reaction with boron tribromide, which in many instances make it extremely difficult, if not impossible, to prepare certain compounds within the claimed class. These strong reaction conditions at times result in unwanted substitution of other desired moieties of the molecule and may even result in cleavage of the compound, thereby precluding formation of the desired compound.

By the present invention, these difficulties in synthesis are completely obviated by employing a methoxymethoxy substituent as the protective group in lieu of a methoxy substituent. The methoxymethoxy substituent, it has been discovered, may be readily removed by hydrolysis under mild conditions, e.g. with a mineral acid, which do not result in any adverse side reactions.

Since certain changes may be made in the above product and process without departing from the scope of the invention herein involved, it is intended that all matter contained in the above description shall be interpreted as illustrative and not in a limiting sense.

What is claimed is:

1. A compound of the formula:

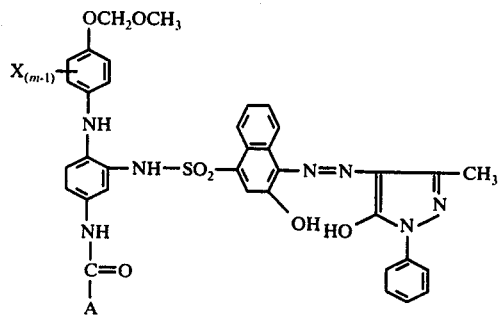

wherein:
X is methyl, methoxy, hydroxy, amino, chloro or carboxy;
m is a positive integer from 1 to 2; and
A is alkyl having from 9–17 carbon atoms.

2. A compound of the formula:

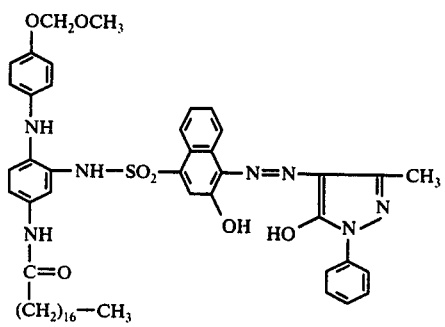

* * * * *